J. W. ALLISON.
WEIGHING MACHINE.
APPLICATION FILED DEC. 20, 1909.
967,299.
Patented Aug. 16, 1910.
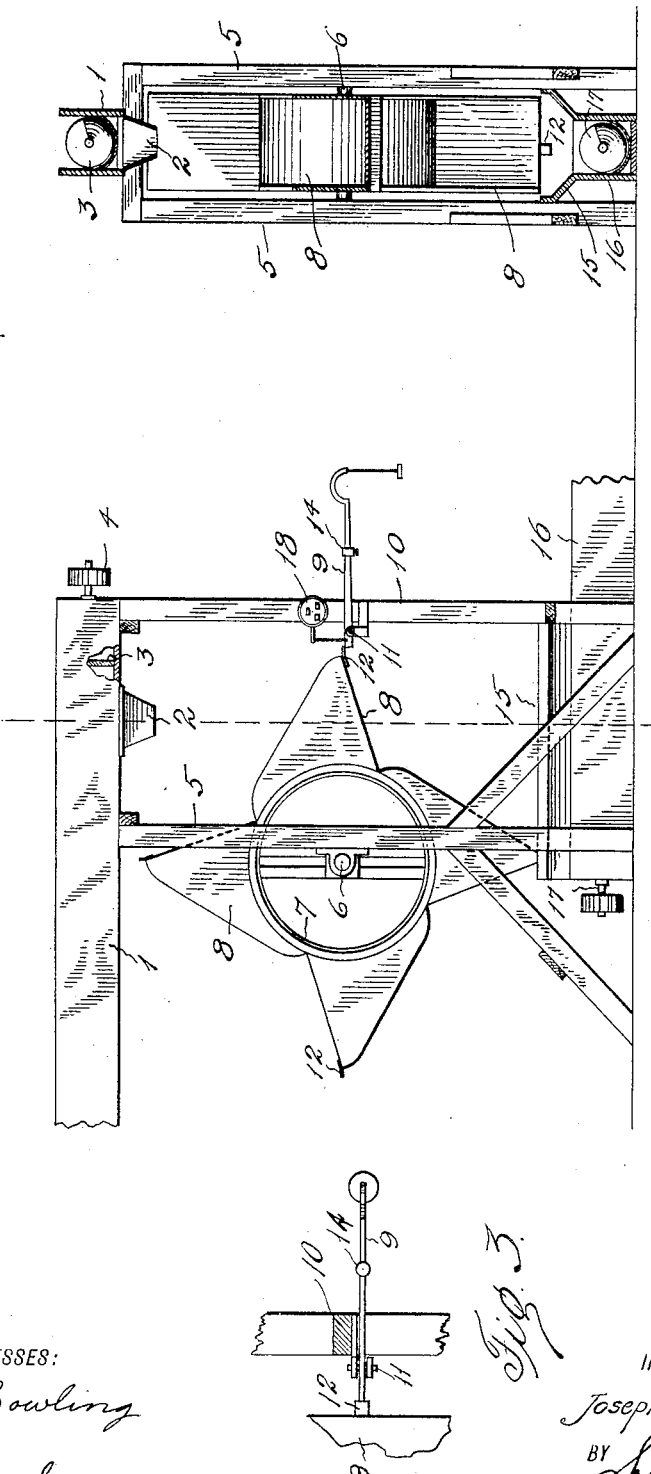
WITNESSES:
Jesse Bowling
L. E. Noack.
INVENTOR
Joseph W Allison.
BY Schley & Davis
ATTORNEYS

UNITED STATES PATENT OFFICE.

JOSEPH W. ALLISON, OF ENNIS, TEXAS.

WEIGHING-MACHINE.

967,299.  Specification of Letters Patent. Patented Aug. 16, 1910.

Application filed December 20, 1909. Serial No. 534,055.

*To all whom it may concern:*

Be it known that I, JOSEPH W. ALLISON, citizen of the United States, residing at Ennis, in the county of Ellis and State of Texas, have invented certain new and useful Improvements in Weighing-Machines, of which the following is a specification.

My invention relates to new and useful improvements in weighing machines and more particular to that class of weighing machines commonly known as "continuous weighing machines" and used to weigh material as it is being transmitted from one point to another.

The object of my invention is to provide a mechanism with a view of simplicity and practicability, among the features which, are rotatable weighing bins in combination with a registering device which will indicate the total number of pounds or gallons that will pass through the bin.

Another object of my invention is to provide a scale beam to be used in connection with my bin which will be very sensitive and which will trip the bins automatically and allow the material to pass out into a hopper when a predetermined amount of weight has passed into the bin.

Finally the object of my invention is to provide a weighing machine of the character described that will be strong, durable and efficient, and one in which the several parts will not be likely to get out of working order.

With these and other objects in view my invention has relation to certain new and novel features of construction and operation, an example of which is described in the following specification and illustrated in the accompanying drawings, wherein:

Figure 1. is a side elevation of my invention, Fig. 2. is a vertical section of the same taken on the line x—x of Fig. 1, and Fig. 3. is a partial plan showing in detail the scale beam and its support.

In the drawings, the numeral 1, designates a conveyer trough or pipe in which any suitable conveyer or pipe may be employed to carry the material solid or liquid to a hopper 2 arranged beneath the conveyer trough. Although I have shown a spiral conveyer 3 arranged in the trough and adapted to be driven at 4, any kind of conveyers may be used to suit different kinds of material.

The standards 5 which assist in supporting the conveyer trough 1 also support a transverse shaft 6 on which a drum 7 is mounted. This drum 7 carries the weighing bins 8 which closely resemble the buckets common to excavating machinery. These bins are made of any suitable sheet metal or other material and are formed with elongated side boards and are set on the drum in such a manner as to allow a very small amount of its surface to be exposed. When material is brought to the hopper 2 by the conveyer 3 it is allowed to drop into one of the bins 8 while the latter is being held in position by a scale beam 9 which is pivoted to a support 10 at 11 and which engages with a lug 12 carried on the end of the bin 8.

By adjusting the sliding weight 14 on the scale beam 9, the bin 8 will be released when a predetermined weight has been deposited within the same. As soon as the bin 8 is released it will cause the drum 7 to rotate and the material will be slid out into a hopper 15 and the next will be brought in position to be filled, while the material in the hopper 15 will be carried on through the conveyer trough 16 by a conveyer 17 for delivery at some other point.

A register 18 arranged above the scale and having connection with the same is fixed to register the number of bins that pass the scale beam. This will be of great value in calculating the number of pounds or gallons weighed. If the weight on the scale beam was set at 50 pounds and the machine set in action until the register would show 10 and then stop, it would be an easy matter to find out the total number of pounds by multiplying the two together giving 500 pounds as a result, the number of pounds of material weighed.

In transferring material from one bin to another this machine will be of great value, and it will also be of great value in weighing grain and cotton seed products as it is being loaded and unloaded from the cars. In weighing such products for transporting now a great quantity is transferred from the storage bin to a weighing bin and hence to the car thus necessitating a double handling. After such products have reached their destination it is necessary to check their weight. To do this they are carried from the car through conveyers to a weighing bin and are then transferred to the storage bin.

It is obvious that by using a weighing device which forms a portion of the conveyer mechanism between the storage tank and the car, and one which will be automatically operated, such products could be weighed much cheaper and without extra handling.

What I claim is:

1. In a weighing apparatus, a cylindrical rotatable member, a support for the member, elongated buckets extending from the periphery of the member, a lug projecting from the outer edge of each bucket, a support adjacent the rotatable member, and a scale beam pivotally supported by the last named support and having the major portion of its length extending outward from the pivot support, the inner end of the scale beam projecting into the path of the lugs of the buckets and successively engaged thereby.

2. In a weighing apparatus, a cylindrical rotatable member, a support for the member, elongated buckets extending from the periphery of the member, a lug projecting from the outer edge of each bucket, a support adjacent the rotatable member, a scale beam pivotally supported by the last named support and having the major portion of its length extending outward from the pivot support, the inner end of the scale beam projecting into the path of the lugs of the buckets and successively engaged thereby, and an indicating device having connection with the inner end of the scale beam.

3. In a weighing apparatus, the combination of vertical supports, an overhead feeding device discharging to one side of the supports, a cylindrical rotatable member mounted between the supports and fixed against vertical movement, elongated buckets extending from the periphery of the rotatable member, and a scale beam supported adjacent the rotatable member and having its inner end projecting into the path of the buckets and arranged to successively arrest each bucket under the discharge of the feeding device.

4. In a weighing apparatus, the combination of vertical supports, an overhead feeding device discharging to one side of the supports, a cylindrical rotatable member mounted between the supports, elongated buckets extending from the periphery of the rotatable member, a lug at the central portion of the outer edge of each bucket, a scale beam pivoted adjacent the rotatable member and having its inner end projecting into the path of the lugs to be successively engaged thereby and arrest the buckets under the discharge of the feeding device.

5. In a weighing device, a hollow drum, elongated buckets, each comprising a bottom and side boards extending from the periphery of the drum, a lug on the extreme outer edge of the bottom of each bucket, and a scale beam having its inner end projecting into the path of the lugs and intermittently engaged thereby.

In testimony whereof I have signed my name to this specification in the presence of two subscribing witnesses.

JOSEPH W. ALLISON.

Witnesses:
W. S. TERRELL,
JACK A. SCHLEY.